Oct. 21, 1969

J. CYR 3,473,305

HARVESTER DRIVE SYSTEM

Filed Oct. 26, 1966

INVENTOR.
JOSEPH H. CYR

BY
Donald D. Schaper

ATTORNEY

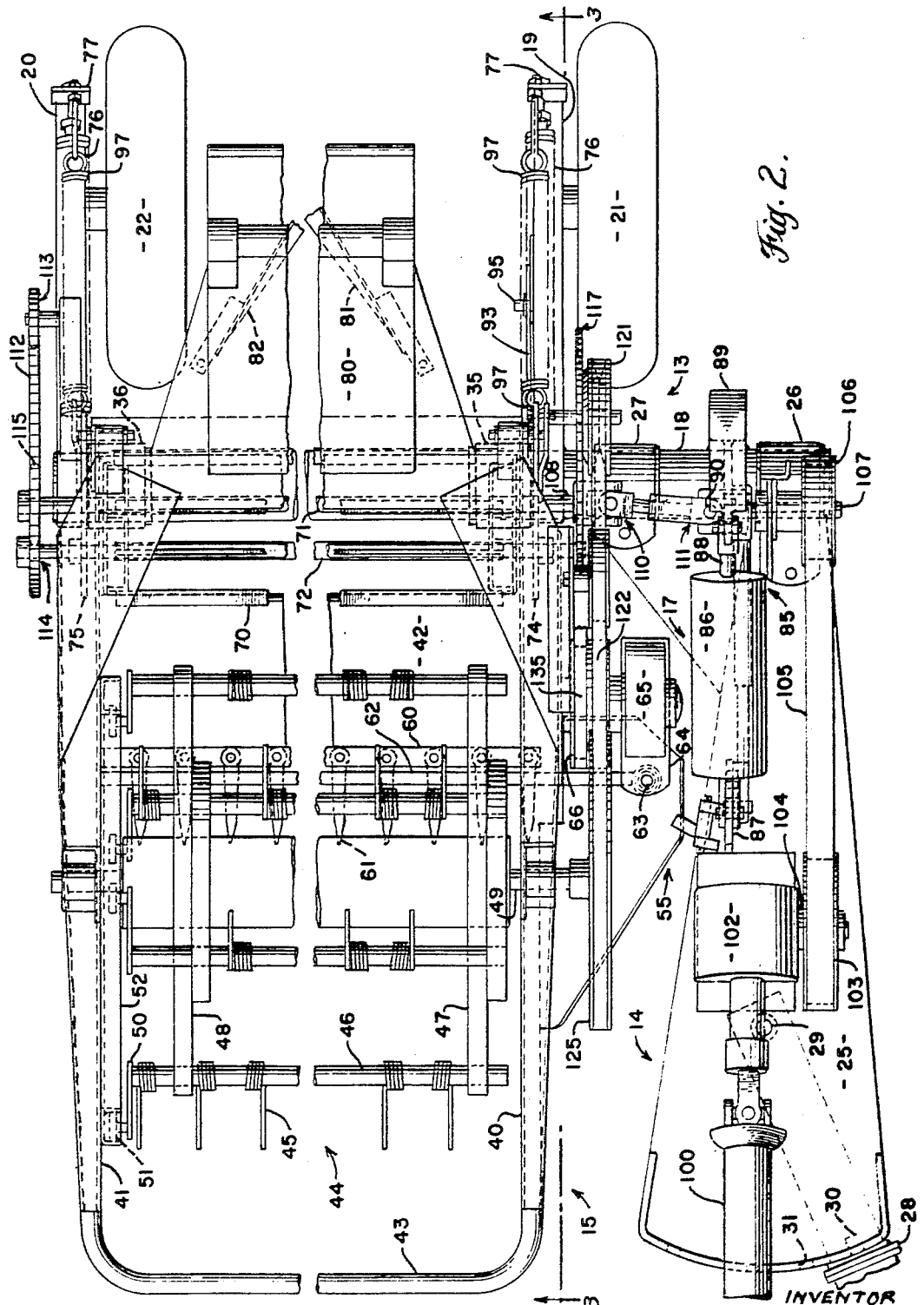

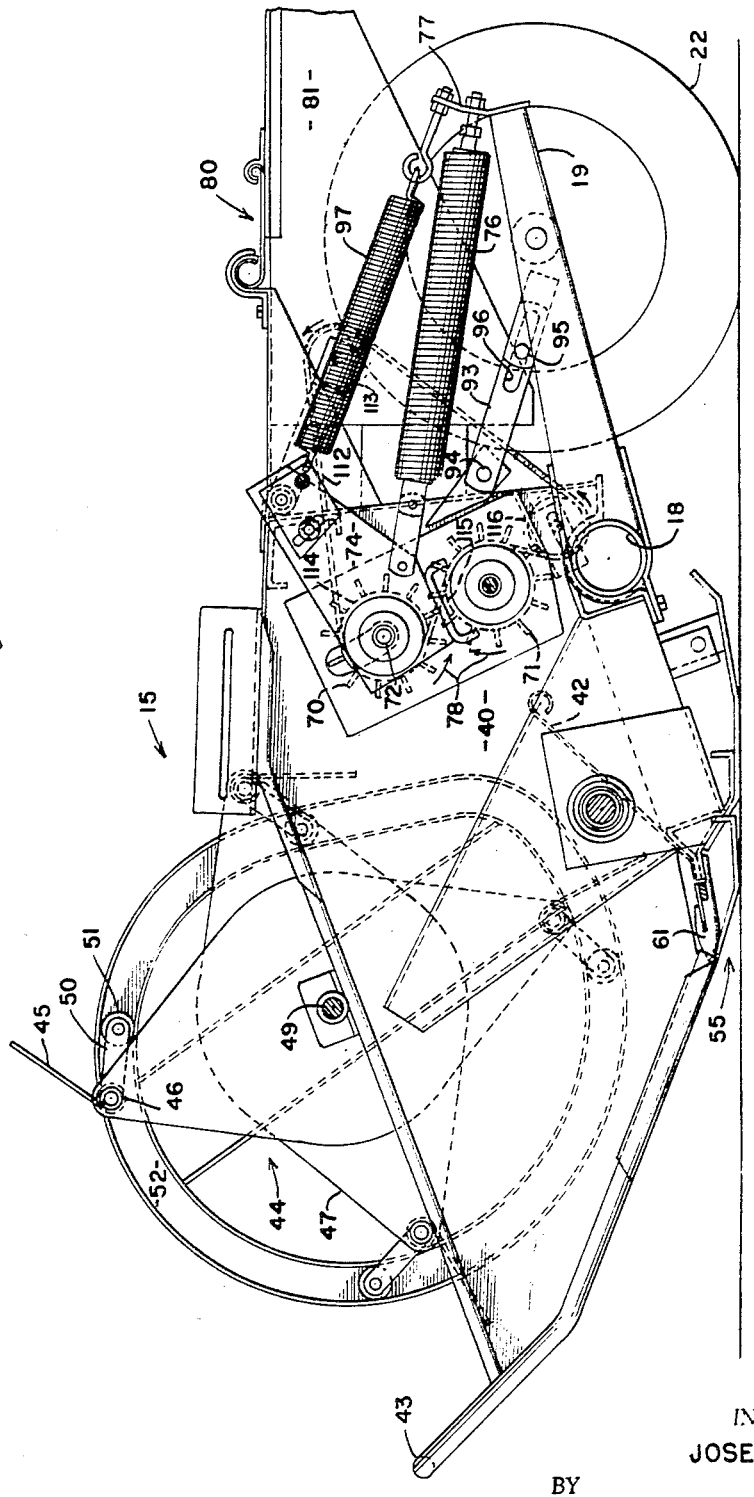

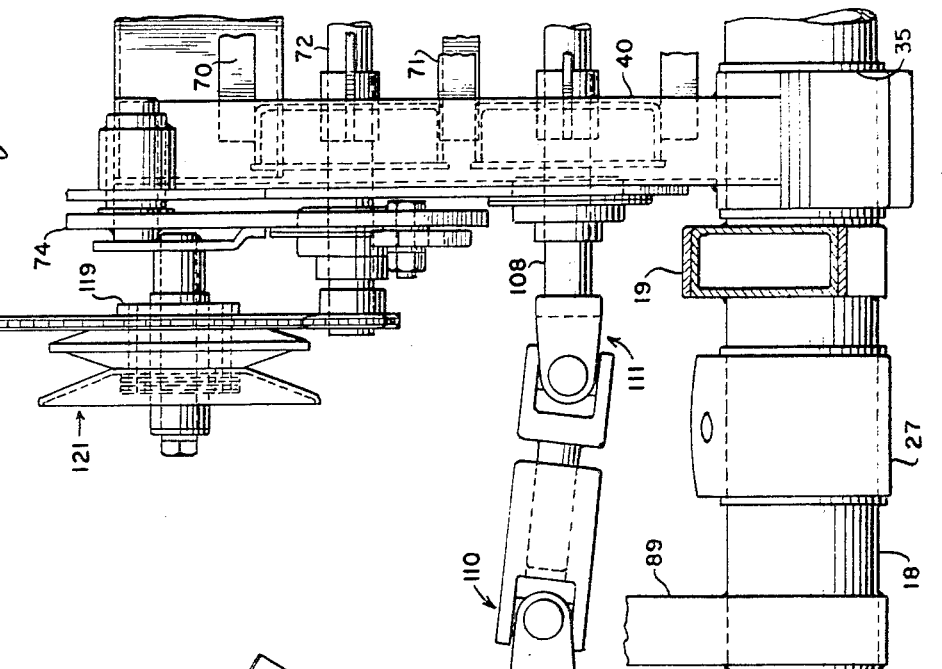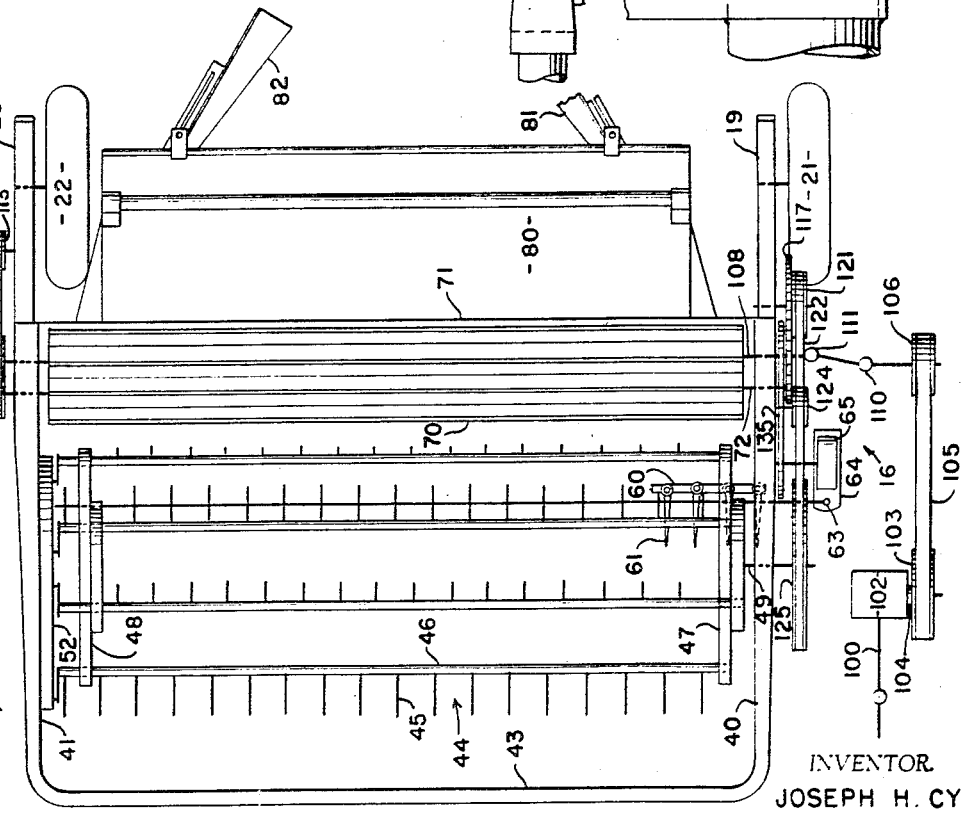

United States Patent Office 3,473,305
Patented Oct. 21, 1969

3,473,305
HARVESTER DRIVE SYSTEM
Joseph Cyr, Longvic, France, assignor to Sperry Rand Corporation, New Holland, Pa., a corporation of Delaware
Filed Oct. 26, 1966, Ser. No. 589,705
Int. Cl. A01d 35/12, 43/02, 55/26
U.S. Cl. 56—23          9 Claims

ABSTRACT OF THE DISCLOSURE

An agricultural machine having a wheel supported frame structure, a header pivotally mounted on the frame structure and a drive system for transmitting power to crop treating elements supported by the header. The drive system provides motive power to some of the crop treating elements at one side of the machine and the others at the opposite side of the machine.

---

This invention relates generally to agricultural machines of the harvester type for cutting and processing hay or other crop material. More particularly, the invention relates to an improved drive system for crop treating elements carried on the header of a mower-conditioner.

A mower-conditioner comprises generally a wheel supported frame and a header carried thereon which is adjustable in a vertical direction both for field operation and for transporting the machine from one field to another. The header comprises a mower for severing the crop material, a reel for raking the material rearwardly from the mower, and a pair of conditioner rolls which receive the crop material from the reel and discharge it rearwardly in a swath or into windrow forming means.

The drive system for the crop treating elements of a mower-conditioner is normally powered from the power take-off of the tractor, or towing vehicle. It is common to mount a power take-off shaft along one side of the mower-conditioner and to drive all of the crop treating elements from one side of the machine. The drive system is relatively complex, since four elements must be driven at different vertical heights and at different speeds. Means must also be provided in the system for vertical movement of one of the conditioner rolls relative to the other and for pivotal movement of the header relative to the machine frame.

A principal object of this invention is to provide a simplified and improved drive system in a mower-conditioner of the type described.

Another object of this invention is to provide an improved distribution of the drive system components whereby the overall width of the present machine can be reduced, without reducing the effective width of the machine.

Another object of this invention is to ultilize crop treating elements as torque-carrying elements in the drive system.

A further object of this invention is to provide a drive system wherein power is transferred progressively from the crop treating elements on the lower portion of the header to the elements at the top portion of the header.

A still further object of this invention is to provide a drive system which efficiently functions at all operating positions of the header and which effectively compensates for varying quantities of crop material.

Other objects of this invention will be apparent hereinafter from the specification and from the recital in the appended claims.

In the drawings:

FIG. 2 is a plan view of FIG. 1 with the central portion of the mechine broken out to condense the figure;

FIG. 3 is a side elevational view taken approximately on the line 3—3 of FIG. 2;

FIG. 4 is a plan view diagrammatically illustrating the drive systems; and

FIG. 5 is a fragmentary, somewhat enlarged end view, taken approximately as indicated by the line 5—5 of FIG. 1.

Figure 1:
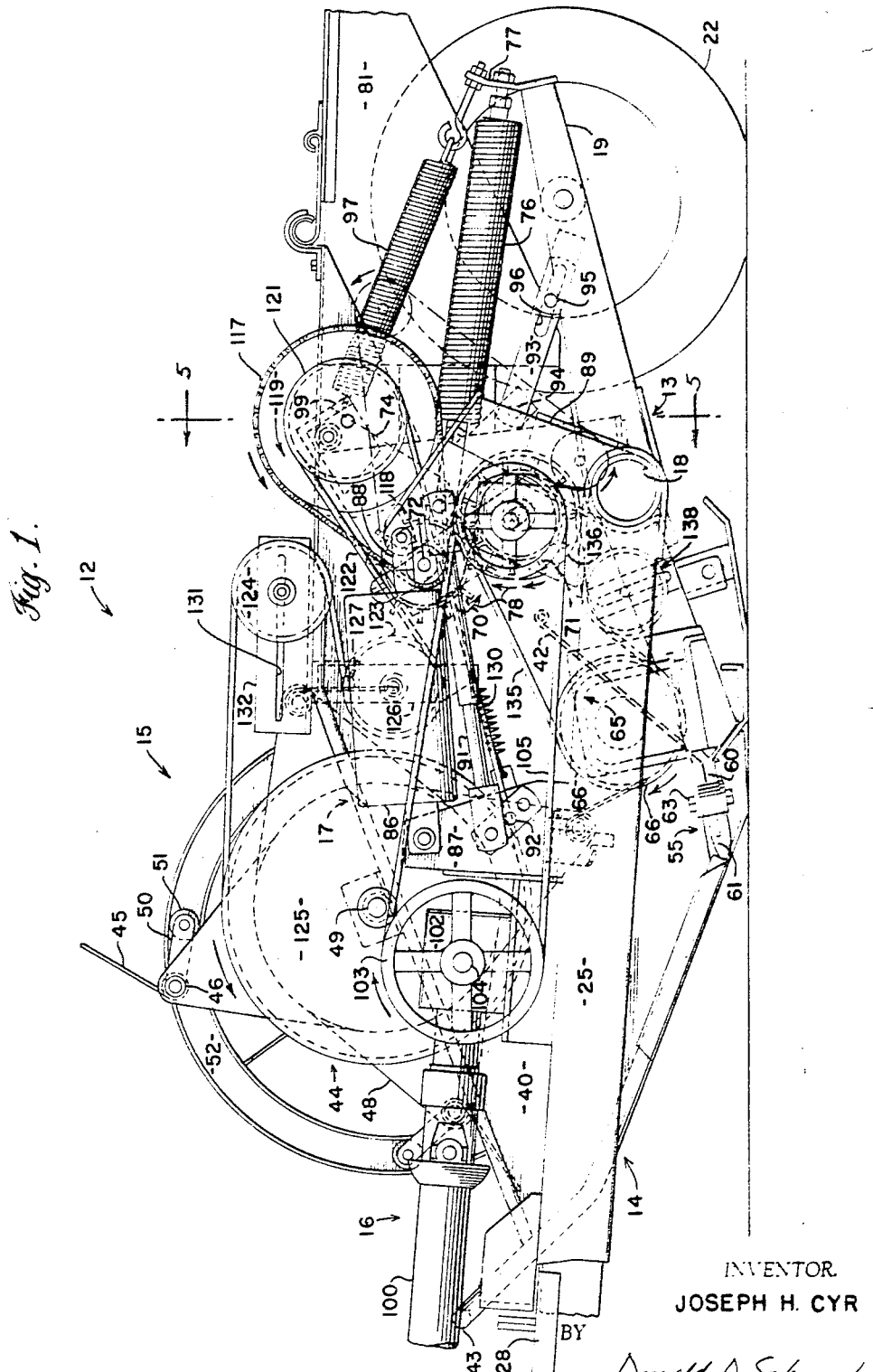
FIG. 1 is a side view of the mower-conditioner constructed in accordance with the principles of the present invention, with the inboard wheel omitted, and showing the components of the drive system on the inboard side of the machine.

Referring now to the drawings by numerals of reference, and particularly to FIGS. 1 and 2, the machine of this invention is designated generally 12 and comprises a transversely extending frame structure 13, a draft frame 14 along one side of the machine, referred to as the inboard side of the machine, a header 15 which extends from adjacent the draft frame to the opposite side of the machine, referred to as the outboard side, a drive system 16 which furnishes power to the crop treating elements carried on header 15, and a power means 17 for vertically positioning header 15.

Frame structure 13 consists of a rockshaft 18, an inboard wheel arm 19 fixed to rockshaft 18, as by welding, an outboard wheel arm 20 fixed to rockshaft 18, and a pair of wheels 21 and 22 journalled respectively in wheel arms 19 and 20.

Draft frame 14 comprises a massive center section 25 and a pair of rearwardly located bearing elements 26 and 27 which support draft frame 14 on rockshaft 18 for rotatable movement thereabout. A tongue 28 is pivotally mounted to center section 25 at 29 and has a pin 30 which can be selectively positioned in any of a series of holes 31 in section 25, depending on the towing position desired. Tongue 28 is adapted to be mounted to a towing vehicle, not shown.

Header 15 is pivotally supported on a rockshaft 18 by a pair of mounting sleeves 35 and 36 (see FIGS. 2 and 5). Header 15 comprises a subframe for supporting the crop treating elements and which consists of side panels 40 and 41, and a guide plate 42 extending between and joining the side panels at their lower edges. A crop engaging bar 43 extends across the forward end of header 15.

A reel 44 is rotatably mounted in the header side panels 40 and 41 and has crop engaging fingers 45 which are carried on bars 46 at the outer periphery of the reel. Bars 46 are journalled in the reel spiders 47 and 48 which are carried on reel shaft 49. As seen in FIGS. 1 and 2, each of the bars 46 has a crank arm 50 carried on its outboard end. Each of the arms 50 carries a roller-type cam follower 51 at its one end. The followers 51 ride in a channel-shaped cam track 52 which causes the tines 45 to travel in a desired path in a well known and conventional manner.

A mower 55 comprising a cutterbar 60 is mounted on header side panels 40 and 41 and extends therebetween, as shown in FIGS. 1, 2, and 3. A plurality of conventional sickle guards 61 are fixedly mounted on cutterbar 60, and a sickle bar indicated at 62 reciprocates on the guards. As shown in FIG. 2, the inboard end of sickle bar 62 is pivotally connected at 63 to the forward end of a fore-and-aft extending rocker arm 64. Rocker arm 64 is reciprocated by a wobble drive 65 which receives power from the input pulley 66, as shown in FIG. 1. Drive means for supplying power to input pulley 66 will be described hereinafter.

An upper conditioner roll 70 and a lower conditioner roll 71 are mounted to header side panels 40 and 41 at a location rearwardly of the mower and reel. Upper conditioner roll 70 is provided with a shaft 72 which is journalled in brackets 74 and 75 pivotally mounted respectively on panels 40 and 41. The pivotally mounted brackets 74 and 75 permit roll 70 to move toward and away from lower conditioner roll 71 to compensate for different loads of crop material. Roll tension springs 76 extending between brackets 74 and 75 and flanges 77 on wheel arms 19 and 20 serve to bias roll 70 in a downward position. Rolls 70 and 71 rotate in the directions indicated by arrow 78 in FIGS. 1 and 3, and a crop receiving bite is defined at the forward edges of the rolls, just prior to the point where they mesh.

A horizontally extending crop deflector plate 80 and windrow shields 81 and 82 are mounted at the rear end of header 22 to receive the crop material from conditioner rolls 70 and 71 and direct the material to the ground in the desired form.

Power means 17 for moving header 15 from an operative position to a transport position is provided by a hydraulic actuator 85, best shown in FIGS. 1 and 2, which receives pressurized fluid from the tractor through a hydraulic power line, not shown. Hydraulic actuator 85 comprises a cylinder 86 which is fixed to a vertically extending bracket 87 on draft frame 14, and a reciprocating piston 88. Piston 88 serves to rotate rockshaft 18 through a bell crank 89 pinned to piston 88 at 90 and welded, or fixed by other means, to rockshaft 18. A telescoping stop 91 is connected to bracket 87 and bell crank 89 to limit movement of header 15 in a counterclockwise direction, as viewed in FIGS. 1 and 3. Holes 92 are provided in bracket 87 so that stop 91 can be adjustably positioned thereon, and thereby determine the lowermost position of header 15.

Power means 17 transmits pivotal movement to header 15 through wheel arms 19 and 20 which are fixed at their inner radial ends to rockshaft 18, and through connecting links 93 which are fixed to header side panels 40 and 41 by pins 94. It will be seen that each link 93 is connected to its respective wheel arm by a pin 95 which extends through a slot 96 in link 93; thus, for a limited amount of rotation of wheel arms 19 and 20, no pulling force will be exerted on header 15 by the connecting links 93. A pair of springs 97 are connected to flanges 77 on the wheel arms and to brackets 99 on the header side panels. The header is held in position by springs 97, and a limited floating action can take place within the limits of slots 96.

Drive system 16 comprises a power take-off shaft 100 which receives power from the towing vehicle, not shown, and delivers it to a gearbox 102 on the forward end of draft frame 14. A sheave 103 mounted on the output shaft 104 of gearbox 102 transfers power rearwardly through a belt 105 to a sheave 106 fixed to a shaft 107 journalled at the rear end of draft frame 14. Shaft 107 drives lower conditioner roll shaft 108 through a pair of universal joints 110 and 111 (see FIGS. 2 and 5). It will be seen that the joints 110 and 111 provide for relative movement between the draft frame 14 and the header 15.

Lower conditioner roll shaft 108 transmits power to upper conditioner roll shaft 72 through a chain 112 on the outboard side of the machine. Chain 112 extends around an idler sprocket 113 journalled at the rear end of bracket 75, a sprocket 114 on upper conditioner roll shaft 72, a sprocket 115 on lower conditioner roll shaft 108, and a second idler sprocket 116 on header side panel 41. As bracket 75 pivots upwardly to allow a heavy load of crop material to pass through the conditioner rolls, sprocket 114 will move upwardly tending to stretch chain 112; however, at the same time idler sprocket 113 on the opposite side of the pivotal mount of bracket 75 tends to move downwardly, thus compensating for the upward movement of sprocket 114 and maintaining the proper chain tension.

Power is taken from the upper roll shaft 72 at the inboard side of the machine to drive reel shaft 49. With reference to FIG. 1, a chain 117 extends around a sprocket 118 on upper roll shaft 72 and a sprocket 119 journalled on bracket 74. A sheave 121 is fixed to one face of sprocket 117 for rotation therewith and transmits power to the reel through a belt 122 which extends around a first idler sheave 123, second idler sheave 124, and finally around sheave 125 mounted on reel shaft 49. Idler sheave 123 is rotatably mounted on a bracket 126 which is pivotally mounted to the header side panel at 127, and is spring biased to pivot in a clockwise direction, as seen in FIG. 1, by a spring 130. Thus, changes in the position of sheave 121 caused by the pivotal movement of bracket 74 are compensated for by spring 130. The tension of belt 122 can be adjusted by positioning sheave 124 along the slot 131 in element 132.

A drive belt 135 transmits power from a sheave 136 on lower conditioner roll shaft 108 to input pulley 66 of the mower wobble drive and is maintained in position by a belt tensioning device 138.

The advantages from the disclosed drive system will be apparent from the foregoing discussion. Most notable of these advantages is the simplified design which results from driving the crop treating elements from both the inboard and outboard sides of the machine, thereby eliminating the congestion which results when all of the elements are driven from one side of the machine. Further, it will be seen that the power input portion of the drive system is located at the lower portion of the header and that the drive system progressively moves upward to the final drive for the reel. Thus, there is no necessity to route the drive chains to the various components across and over each other; and consequently, the overall width of the machine can be reduced, without reducing the effective width of the crop treating elements. The disclosed drive system readily and efficiently compensates by the means described above for vertical adjustment of the machine and for movements of the crop treating elements relative to each other.

Operation of the machine drive system is as follows:

As shown diagrammatically in FIG. 4, power is furnished to the system by power take-off shaft 100 and is transferred to lower roll shaft 108 by the drive components on draft frame 14. Lower roll shaft 108 transmits power across the machine to the outboard side where it furnishes power to upper roll shaft 72 through chain 112. Power is then transmitted across the machine to the inboard side where upper roll shaft 72 drives reel shaft 49 through chain and belt drives. It will be seen that whenever power is furnished to gearbox 102 that the reel, mower, and conditioner are continuously driven.

With the crop treating elements in motion, the harvester 12 is towed through a field of standing crop material. The crop material is severed by the mower and is then raked rearwardly by the crop engaging fingers 45 on the rotating reel 44. Fingers 45 deliver the material into the bite of conditioner rolls 70 and 71. The conditioner rolls discharge the material upwardly and rearwardly into windrow shields 81 and 82 which serve to consolidate the material and form it into a windrow.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. An agricultural machine which is adapted to travel through a field in a forward direction, said machine comprising, in combination:

(a) a wheel supported frome structure including a laterally extending rockshaft;

(b) a draft frame pivotally mounted on said rockshaft at an inboard side;

(c) a header pivotally mounted on said rockshaft outboard of said draft frame and comprising a rotatably mounted reel, mower, an upper conditioner roll, and a lower conditioner roll;

(d) means on said draft frame for receiving power from a power takeoff and for transferring power to said lower conditioner roll;

(e) means for transferring power from said lower conditioner roll to the upper conditioner roll at an outboard side of the frame;

(f) means for transferring power from said upper roll to said reel at an inboard side of said frame; and (g) means for driving said mower from said lower conditioner roll at said inboard side.

2. An agricultural machine, as recited in claim 1, wherein said means for receiving and transferring power from the power take-off comprises a gearbox at the forward end of said draft frame and having an output shaft with a drive sheave thereon, a driven sheave fixed to a stub shaft journalled at the rear end of said draft frame, an endless connector between said drive sheave and said driven sheave, and a pair of universal joints connecting said stub shaft to said lower conditioner roll.

3. An agricultural machine, as recited in claim 1, wherein said means for transferring power from said lower conditioner roll to the upper conditioner roll comprises an endless chain which extends around sprockets on both of said rolls and around a pair of idler sprockets.

4. An agricultural machine, as recited in claim 1, wherein said means for transferring power to said reel comprises a first endless connector which extends around a sprocket on said upper roll and a speed-reducing sprocket on the rear end of said header, and a second endless connector which extends forward from a sheave fixed to said speed-reducing sprocket to a drive wheel fixed to a shaft in said reel.

5. An agricultural machine, as recited in claim 1, wherein (a) said means for driving said mower comprises an endless belt extending between a sheave operatively connected to said lower conditioner roll and a pulley on said mower.

6. An agricultural machine adapted for travel forwardly through a field, said machine comprising, in combination:

a wheel supported frame structure including a laterally extending rockshaft;

a draft frame pivotally mounted at an end of said rockshaft;

a header pivotally mounted on said rockshaft, said header supporting crop treating elements including an upper conditioner roll and a lower conditioner roll;

means on said draft frame for receiving power from a power take-off and for transferring power to said crop treating elements;

means for driving said lower conditioner roll at one side of the machine; and means for transferring power from said lower conditioner roll to another of said crop treating elements at an opposite side of said machine.

7. An agricultural machine, as recited in claim 6, wherein said crop treating elements further includes a reel rotatably supported in said header and a reciprocable mower under said reel.

8. An agricultural machine, as recited in claim 7, wherein said reel is disposed forwardly of said rolls and means is provided for driving said reel from said opposite side of the machine.

9. An agricultural machine, as recited in claim 7, wherein said mawer is also disposed forwardly of said rolls and means is provided for driving said mower from said one lower conditioner roll at said one side of the machine.

References Cited

UNITED STATES PATENTS 3,014,324  12/1961  McCarty.
3,325,981  6/1967  Glass et al. _____ 56—23

ANTONIO F. GUIDA, Primary Examiner

U.S. Cl. X.R.

56—1